F. B. ROLAND & C. D. CHANDLER.
VEHICLE FENDER.
APPLICATION FILED FEB. 8, 1915.
1,212,813.
Patented Jan. 16, 1917.
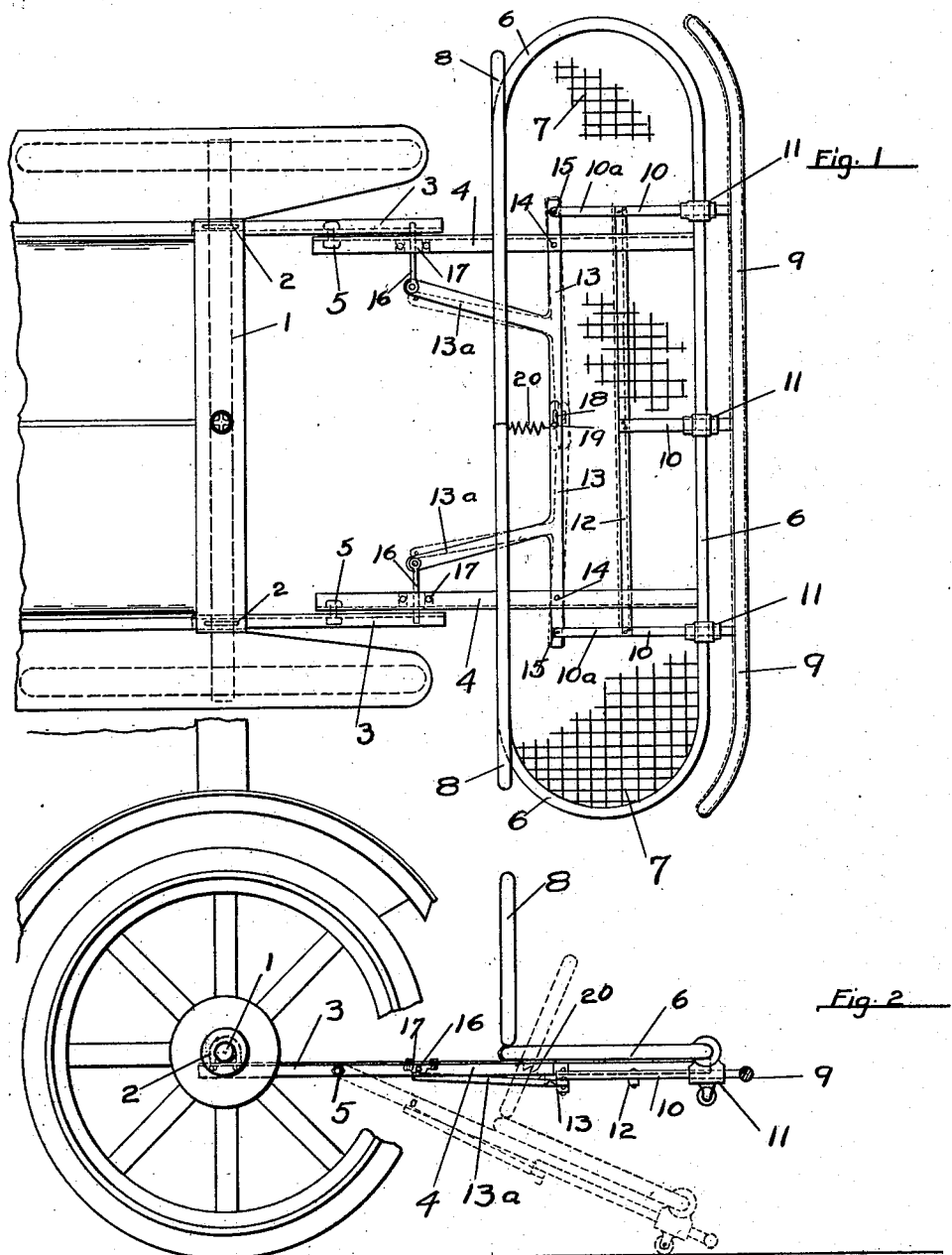

UNITED STATES PATENT OFFICE.

FRED B. ROLAND AND CHARLES D. CHANDLER, OF PORTLAND, OREGON.

VEHICLE-FENDER.

1,212,813.  Specification of Letters Patent.  Patented Jan. 16, 1917.

Application filed February 8, 1915. Serial No. 6,726.

*To all whom it may concern:*

Be it known that we, FRED B. ROLAND and CHARLES D. CHANDLER, citizens of the United States, residing at Portland, in the county of Multnomah, State of Oregon, have invented certain new and useful Improvements in Vehicle-Fenders, of which the following is a specification.

Our invention relates to vehicle fenders, and especially to such fenders as used upon the fronts of automobiles, cars, and the like, and is a modification and improvement of that disclosed in our application for Letters Patent filed Dec. 11, 1914, Serial Number 876,704.

The objects of our invention are: First, to provide mechanism whereby the fender is immediately dropped into operating position upon coming into contact with any obstruction: Second, to provide such a mechanism so delicate and sensitive in operation as not to injure any person with whom it may come into contact: Third, to provide such a mechanism so positive in operation as never to fail to drop into operating position upon coming into contact with any obstruction: Fourth, to provide such a mechanism as will positively and securely retain the fender in suspended position until coming into contact with any obstruction: Fifth, to provide a mechanism that will securely retain the fender in suspended position under all running conditions, and not allow the fender to drop because of any vibration of the vehicle.

In order to easily understand our invention reference may be had to the accompanying drawing, which therefore becomes a part of this application for Letters Patent, and in which:

Figure 1 is a plan view of our invention applied to an automobile. Fig. 2 is a side elevation of same.

Like characters represent like parts throughout the several views of the drawing, in which:

Numeral 1 is the front axle of a vehicle, to which our invention is attached by means of U-bolts 2, said U-bolts passing around the axle and through supporting members 3, as shown. Extension members 4 are provided, the same being respectively pivotally attached to members 3 by bolts 5. Upon the outward or forward ends of member 4 is mounted a frame 6 covered with a woven mesh 7 of wire, cotton or other suitable material. Attached to the rearward side of frame 6 is a similar frame 8, arranged to stand vertically in a manner fully described in our previous application for Letters Patent mentioned above, and therefore unnecessary of description herein, now Patent Number 1,201,103, issued Oct. 10, 1916.

Immediately in front of frame 6 we provide a contact bar 9 having rigidly attached thereto rearwardly extending members 10, said members 10 being slidably supported in guides 11 attached to and depending from the forward portion of frame 6 as shown. There may be as many members 10 as the width of the vehicle and the strength of the parts demands, and said members 10 are all connected by a cross member 12.

The extreme pair of members 10 are extended rearwardly beyond cross bar 12, as shown at 10ª.

A pair of bell cranks are provided, having cross arms 13 and rearwardly extending arms 13ª, said bell cranks being pivotally mounted upon members 4 by pins 14 and also pivotally attached to members 10ª by pins 15. Pivotally attached to the extreme rearward ends of arms 13ª are pins 16, said pins being adapted to enter apertures in members 4 and also corresponding apertures in members 3, as shown in Fig. 1. Brackets 17 are attached to members 4, said brackets having apertures registering with the apertures in members 4 for the pins 16, and the said brackets provide a support for pins 16 when the same are withdrawn sufficiently to disengage the members 4 from the members 3. One of the pair of bell cranks has a slot 18 in its cross arm, and the other bell crank is provided with a pin 19 adapted to enter said slot 18 as shown in Fig. 1, and thus cause the bell cranks to operate together about their respective fulcrum pins 14. A spring 20 connects pin 19 with the rearward portion of frame 6 for the purpose of retaining the bell cranks 13 in their normal position and also to return same to their normal position after having been operated.

Our invention operates as follows: Upon coming into contact with any obstruction the bar 9 with its attached members 10 is moved rearwardly, the members 10 sliding in the supports 11. Said rearward motion of members 10 and 10ª cause bell cranks 13 to move about fulcrum pins 14, and this motion of the bell cranks withdraws pins 16 from their respective apertures in members 3, thus releasing members 4 from members 3 and allowing the entire structure except the supporting bars 3 to drop by gravity, swinging downward about pins 5 into such a position that the obstruction will be deposited upon the woven mesh 7 within frame 6.

Our device may be constructed of any materials and be made of any size deemed suitable and convenient for a device of this character, and while we have illustrated and described a preferred form of construction and arrangements of parts considered desirable in materializing our invention, we wish to include in this application for Letters Patent all mechanical equivalents and substitutes that may fairly be considered to come within the scope and purview of our invention as defined by the appended claim.

Having described and illustrated our invention so that others skilled in the art may be enabled to construct and to use the same, what we claim as new and wish to secure by Letters Patent is:

A vehicle fender comprising a duality of supporting members rigidly secured to the front axle of the said vehicle, and having orifices adjacent the front end thereof; a duality of extension members pivoted respectively upon said supporting members, and having orifices therein adapted to register with said orifices in the supporting members when said extension members are in alinement therewith; a duality of pins each mounted within its respective orifice in one of said extension members and adapted to extend therefrom into the adjacent orifice in the supporting member adjacent thereto; a horizontally disposed frame mounted upon said extension members, said frame being covered with woven fabric or mesh; a vertically disposed frame secured to the rearward side of said horizontally disposed frame, said vertically disposed frame being covered with woven fabric or mesh; a trinity of bearings mounted upon the forward end of said horizontally disposed frame, one of said bearings being centrally disposed, and the other two of said bearings being disposed respectively upon the outside of said extension members; a contact bar substantially equal in length to said horizontally disposed frame, and horizontally disposed in front of and in substantially the same plane as said frame; rearwardly extending members integral with said contact bar, each slidably mounted within one of said bearings; a bar substantially parallel to said contact bar and connecting said rearwardly extending members; a duality of T shaped bell cranks, each pivoted upon one of said extension members, each of said bell cranks having a rearwardly extending arm pivotally connected to the adjacent one of said pins, and a transversely disposed arm overlapping the transversely disposed arm of the adjacent bell crank, one of said transversely disposed arms having a longitudinal slot therein, and the corresponding transversely disposed arm having fixed therein a pin adapted to engage said slot; and a spring adapted to hold said pins engaged with the orifices in said supporting members until same are withdrawn by said contact bar meeting with some obstruction.

In witness whereof we claim the foregoing as our invention; we hereunto affix our signatures in the presence of two witnesses.

FRED B. ROLAND.
CHARLES D. CHANDLER.

Witnesses:
   DAVID E. LOFGREN,
   J. A. BACKSTRAND.

Copies of this patent may be obtained for five cents each, by addressing the "Commissioner of Patents, Washington, D. C."